Dec. 2, 1924.  1,517,874
B. C. VAN EMON
ELEVATOR DRIVE
Filed May 31, 1922   2 Sheets-Sheet 1
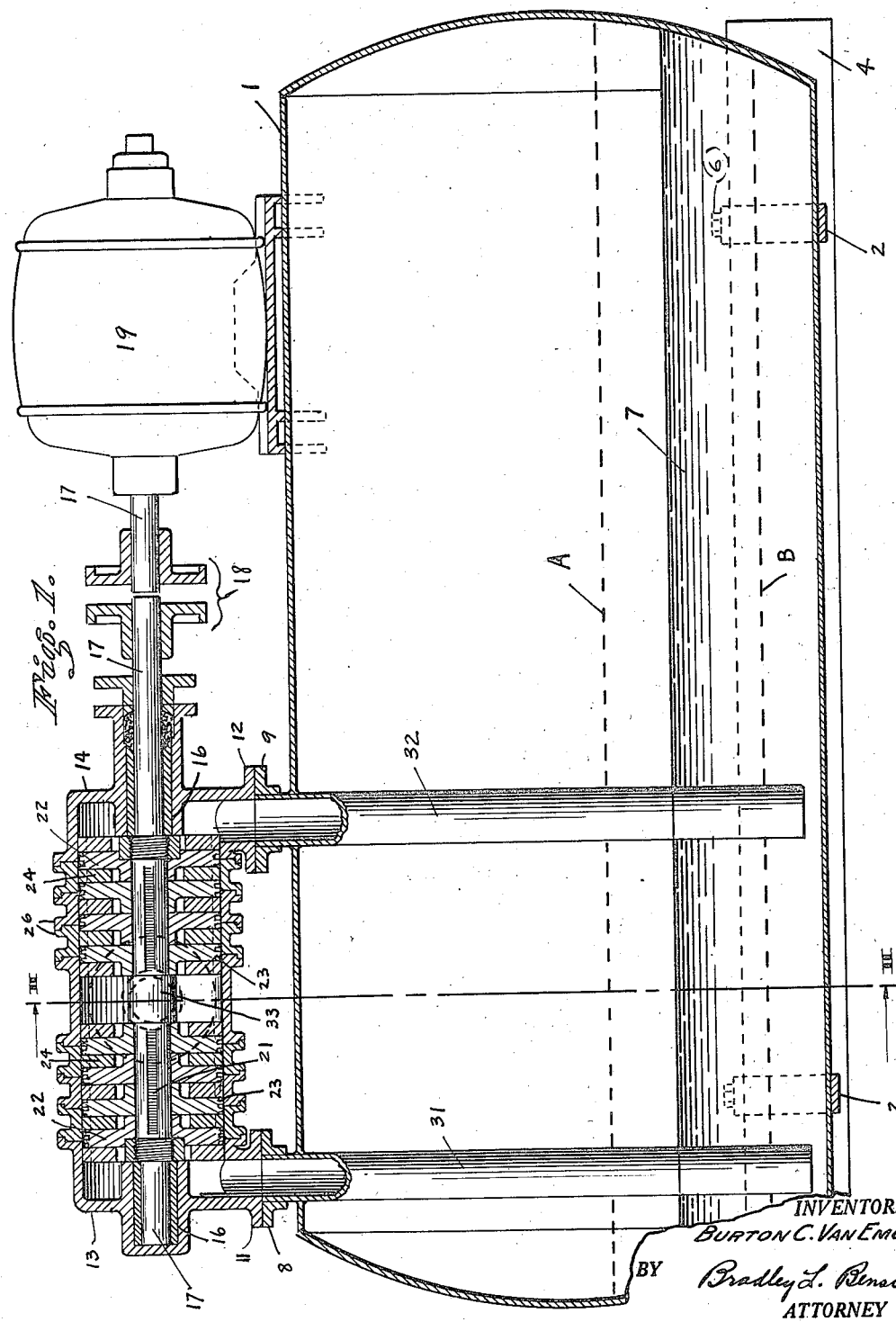
INVENTOR.
BURTON C. VAN EMON
BY Bradley L. Benson
ATTORNEY

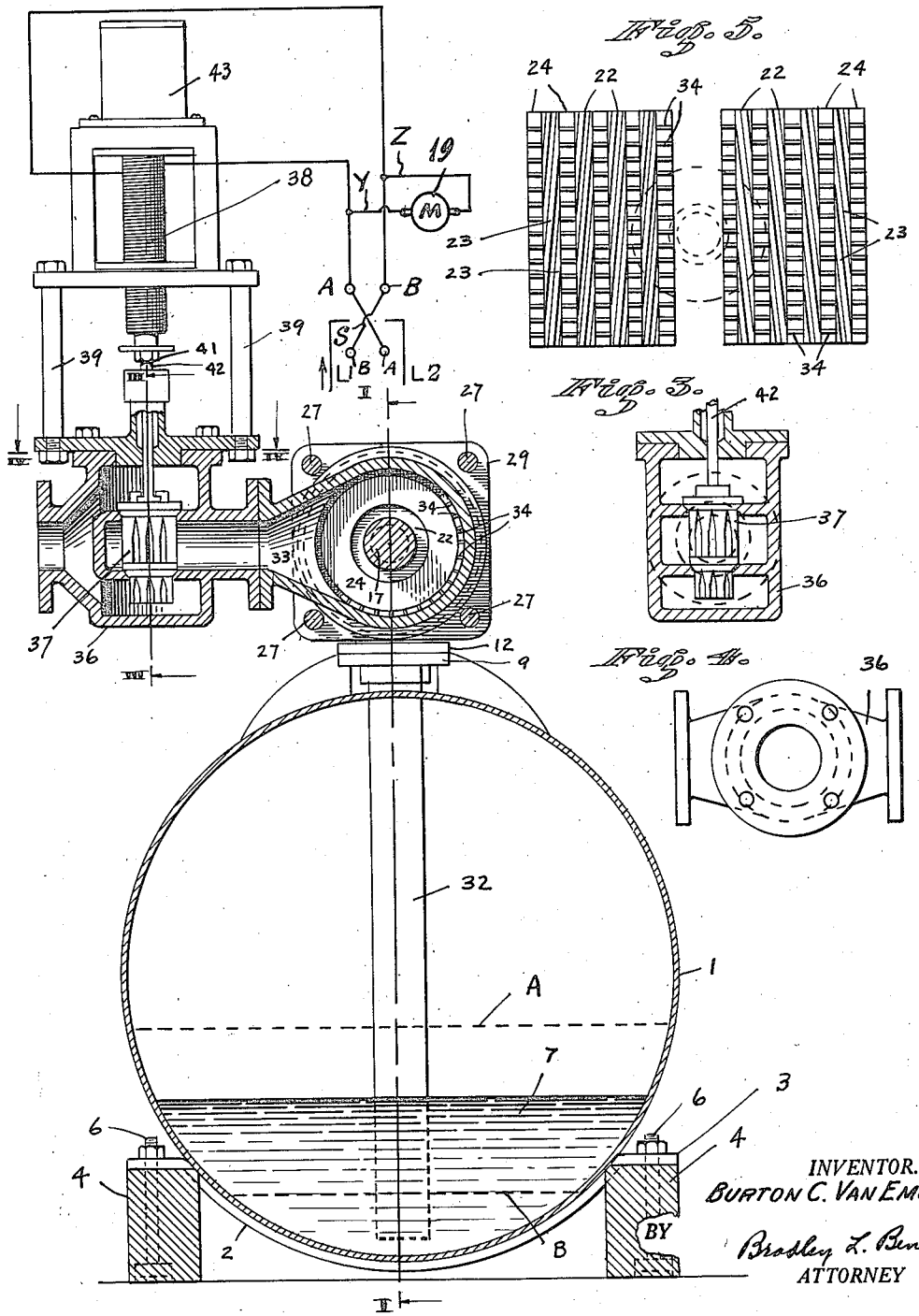

Patented Dec. 2, 1924.

1,517,874

UNITED STATES PATENT OFFICE.

BURTON C. VAN EMON, OF SAN FRANCISCO, CALIFORNIA, ASSIGNOR TO JAMES M. KOFORD, TRUSTEE, OF OAKLAND, CALIFORNIA.

ELEVATOR DRIVE.

Application filed May 31, 1922. Serial No. 564,757.

*To all whom it may concern:*

Be it known that I, BURTON C. VAN EMON, a citizen of the United States of America, residing at 235 First Street, San Francisco, in the county of San Francisco and State of California, have invented certain new and useful Improvements in Elevator Drives, of which the following is a specification.

The present invention is an improved drive means for hydraulically operated devices such as, for instance, an elevator. The invention contemplates economy in operation and efficiency in rapid pressure accumulation and diversion of liquid, and a simple means for reversing the flow to reverse the operation.

The objects of this invention include;

(a) The maintenance of a quantity of liquid in a container wherein a quantity of air is trapped and compressed by the entrance of said liquid to exert pressure on the liquid and thereby assist in reverse operations;

(b) The maintenance of liquid under pressure whereby a pump on the supply line controlling the liquid operated device will begin operating upon liquid which is already under initial pressure of, for instance, 45 pounds per square inch, instead of at zero;

(c) The provision of an elevator control which is reversible by a simple operation and one which will quickly respond to a change of control to effect a change of direction, up or down.

Other objects, such as economy of power use and certain structural features which render the component parts of the device readily accessible for replenishment and repair, will be seen as description proceeds.

While the invention is here shown in the form considered to be the best, it is not limited to such form, as it may be embodied in other forms, and it is to be understood that in the following specification and the annexed claims it is desired to cover the invention in whatever form it may be embodied.

Referring to the drawings (two sheets), Figure 1 is a vertical longitudinal cross-section of my device taken on the line I—I of Fig. 2.

Fig. 2 is a cross-section of Fig. 1 taken on the line II—II.

Fig. 3 is a cross-section of a valve control and is taken on the line III—III of Fig. 2.

Fig. 4 is a top plan view of a valve casting as it would look if the parts shown in Fig. 2 were separated on the line IV—IV, and Fig. 5 is a flat projection of 180 degrees of the circumference of a plurality of pump runners or impellers with webbed baffle plates interposed therebetween.

Referring to the drawings, Fig. 1, the numeral 1 indicates an air tight tank or reservoir supported on foundation straps 2 provided with flanges 3 secured to timbers 4 by bolts 6.

Within the tank 1, I show a quantity of liquid 7, the high and low levels of which are indicated by dotted lines A and B respectively. At 8 and 9 I show flanges welded to the reservoir 1 to register with corresponding flanges 11 and 12 on end members 13 and 14 of a composite pump housing. The end members 13 and 14 are provided with bearings 16 for a shaft 17, connected by a flexible coupling 18 to a motor 19, supported on the tank 1.

The shaft 17 is provided with a keyway 21 in which is placed a key to drive impeller rings 22. On the outer periphery of these rings are upstanding flanges 23 extending helically around said rings. These helical flanges diminish to a knife edge on each side of the rings 22.

Interposed between the impeller rings 22 and fixed against rotation therewith are baffle plates 24 provided with interlocking or complementary configurations, as shown at 26, whereby, when the end members 13 and 14 of the pump housing are drawn together by bolts 27, Fig. 2, extending in quadrilateral arrangement through the corners of square flanges 29 (integral with the members 13 and 14), the entire device forms a liquid tight housing.

Extending through the tank 1 and connecting the interior thereof with that of the pump housing are twin pipes 31 and 32 terminating below the surface of the liquid 7.

It will be seen that the impeller rings 22, Fig. 5, are disposed in right and left relation on opposite sides of a common exhaust passage 33, Fig. 1. When the motor 19 rotates shaft 17 the liquid 7 is drawn through pipes 31 and 32 and flows through the interstices formed by baffles 34 radially disposed on the plates 24.

The purpose of these baffles is to prevent a whirling movement of the liquid as it is forced through the housing to passage 33.

The helical flanges 23 of the impeller rings rotate at high speed and force the liquid 7 through the housing. Because of the thread-like structure of the impeller flanges 23 they are equally effective when driven in reverse direction, and because of the right and left disposition thereof the thrust is balanced.

Assuming that the exhaust passage 33 is connected by a pipe line to the cylinder or ram of a hydraulic elevator (not shown) if the motor is driven, liquid 7 will be drawn from tank 1 and forced through passage 33 and lift the elevator, thereby reducing somewhat the pressure in tank 1. If the elevator is loaded in descent, power is not required as the displacement of liquid through the pump housing must rotate the impeller rings. However, if the pump be reversed (by reversing the direction of rotation of motor) said pump will replace the liquid and restore the original initial pressure in tank 1.

The reversible pump mechanism is not claimed per se in this application for patent, as the same is being made the subject matter of another application for patent.

In Fig. 2, I show a valve housing 36 interposed on the work line connected with passage 33 to lock the liquid against displacement when the elevator is at rest. In this housing I show a balanced control valve 37 which is reciprocal by means of a solenoid 38 supported above the valve housing by bolts 39 and connected at 41 to valve stem 42 of valve 37. A dash pot 43 retards the movement of the solenoid to effect smooth operation. The solenoid is controlled by the same electrical circuit that controls the motor.

It is common practice in elevator operation to use a centrifugal pump to create an operating pressure of, for instance, ninety pounds per square inch.

Instead of taking pressure at zero and raising it to ninety pounds, I prefer to maintain an initial working pressure of forty-five pounds and raise this to ninety when required.

By this means I effect a saving of fifty per cent of the required horsepower.

Instead of losing pressure at each reciprocation, I utilize the gravity of the descending elevator to restore the working pressure, with the assistance of the pump, if desired.

In Fig. 2 I have shown the wiring plan diagrammatically. The wires $L^1$ and $L^2$ constitute the main line service to the motor 19 and solenoid 38. Current passing in over line $L^1$ goes to the fulcrum of a reversing switch S. Said switch is of a type known as and commonly called two pole, double throw, knife switch.

Current passes from $L^1$ to pole A, when the switch is thrown up, thence through solenoid 38 back to pole B, through the switch, to $L^2$. Said current also passes through motor 19, said motor being on a multiple branch line Y—Z.

When the switch is thrown down the current is reversed, power entering through $L^1$ is contacted to B terminal of the switch, thence passing through wire Z to the motor 19, and from the motor, through wire Y, to contact A on the switch. The solenoid, being in multiple with motor circuit Y—Z, will also be energized in reverse direction.

The reversing switch S would, of necessity, be positioned in the moving cage of the elevator for starting and stopping same.

I claim;

1. A liquid drive for electrically controlled elevators and the like, comprising a tank containing liquid normally maintained under pressure, a pipe for conducting said liquid from the tank to said elevator and vice versa, a reversible pump interposed in said pipe and adapted to force liquid therethrough in either direction to reciprocate said elevator, electrically operated means for actuating said pump, a valve in said pipe adapted, when closed, to lock the liquid against displacement, electrically operated means for the valve, and a single electric control means for simultaneously controlling the pump-actuating means and the valve operating means.

2. A device of the character described comprising a tank containing liquid under pressure, a pipe line connecting said tank with a liquid operated elevator car, a reversible pump interposed in said pipe line, a motor for driving said pump, an electrical circuit connecting said motor and said elevator, whereby said motor may be controlled electrically from said car, a valve in said pipe line, electrically operated means interposed in said circuit for actuating the valve and electrically operated common control means, within the car and associated with said circuit, whereby the direction of rotation of said motor may be reversed and the said valve actuated simultaneously.

3. A liquid drive for electrically controlled elevators and the like comprising a tank containing a quantity of liquid normally maintained under pressure, a pipe for conducting said liquid to said elevator from the tank and vice versa, a reversible pump interposed in said pipe and adapted to force liquid therethrough in either direction to reciprocate said elevator, an electric motor for driving said pump, an electric circuit for the motor, a valve in said pipe adapted, when closed, to lock the liquid against displacement, electrically operated means for the valve interposed in said circuit, and a single control means in the circuit for simultaneously controlling the motor and valve operating means.

4. A device of the character described comprising an air-tight tank containing liquid normally under pressure, a pipe for conducting said liquid to said elevator from said tank and vice versa, a reversible pump interposed in said pipe and adapted to force liquid therethrough in either direction to reciprocate said elevator, electrically operated means for actuating said pump, said pump, when it is not being actuated by said means, permitting the liquid to flow from the elevator to the tank, a valve in the pipe for preventing the flow of the liquid when the elevator is to be halted, electric means for controlling said valve, and a common electric control for the pump actuating means and the valve controlling means.

In testimony whereof I affix my signature.

BURTON C. VAN EMON.